Patented July 11, 1939

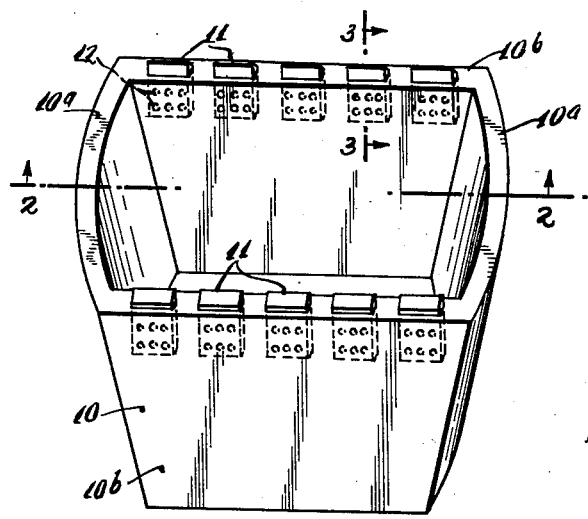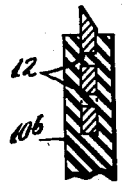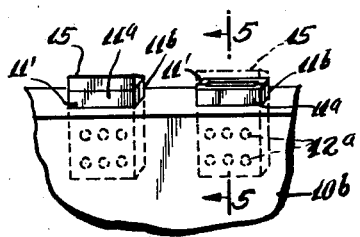

2,165,679

UNITED STATES PATENT OFFICE 2,165,679

PLASTER MIXING CUP

Paul Ringman, St. Albans, N. Y.

Application April 1, 1938, Serial No. 199,409

2 Claims. (Cl. 259—145)

This invention relates to new and useful improvements in a plaster mixing cup.

The invention has for an object the construction of an article as mentioned which is characterized by a cup-shaped flexible rubber body of a particular shape and design to facilitate the mixing of plaster and the cleaning and removing of hardened plaster from the cup.

It is proposed that the rubber body be of substantially frusto-pyramidal form having curved ends and flat sides and holdable in the palm of one's hand with the thumb on one flat side and the four fingers on the other flat side. When thus used, a tool for mixing and removing plaster may be conveniently moved back and forth along the curved ends of the rubber body.

Still further the invention contemplates the provision of a plurality of narrow steel blades to be molded in the flat sides of the rubber body and to project slightly from the top portion thereof and adapted to be used to clean off hardened plaster from tools being used during the mixing process.

Another object of this invention resides in a novel arrangement of the steel blades so that edge members may be mounted thereon and removed in a particular manner.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of a plaster mixing cup constructed according to this invention.

Fig. 2 is a vertical sectional view taken on the line 2—2 of Fig. 1.

Fig. 3 is a fragmentary enlarged sectional view taken on the line 3—3 of Fig. 1.

Fig. 4 is a perspective view of a portion of a plaster mixing cup constructed according to a modification of the invention.

Fig. 5 is a sectional view taken on the line 5—5 of Fig. 4.

Fig. 6 is a perspective view of one of the edge members.

Fig. 7 is a similar view to Fig. 2 but illustrating another form of the invention.

Fig. 8 is a fragmentary sectional view, taken on the line 8—8 of Fig. 7.

The plaster mixing cup, according to this invention, comprises a cup shaped flexible rubber body $10$ of frusto-pyramidal form having curved ends $10^a$ and flat sides $10^b$. The rubber body is of a size to be holdable in the palm of one's hand so that the thumb rests against one flat side and the four fingers against the other side. When thus held the hand may be closed and opened for kneading the plaster in the cup when the plaster is soft, and when the cup is being cleaned for chipping off hardened plaster.

A plurality of narrow steel blades $11$ are embedded in the said flat sides $10^b$ and project slightly from the top portions of these sides. These blades are bevelled at the top and are in edge alignment with each other slightly spaced from each other. The blades are held in position by reason that each of the blades is formed with several openings $12$ through which the mass of rubber body passed during the molding or forming of the rubber body. Thus, each blade is molded into the material of the plaster mixing cup.

Tools used by a workman during the mixing process may be scraped upon the projecting edges of the blades $11$. A feature of the invention resides in the fact that because each of the sides of the rubber body is provided with a plurality of the blades slightly spaced from each other the body remains flexible. The rubber body $10$ may be squeezed and deformed as required without interference from the blades $11$. The operation of this device is as follows: The ingredients for making plaster are placed within the cup in their proper sequence. The cup is then held in one's hand with the thumb extending along one of the flat sides and with the fingers extending along the other of the flat sides so that the walls of the cup may be compressed and released from kneading the plaster. At the same time a flat tool is held in the other hand and is inserted in the cup and used for mixing the contents. As the plaster forms on the tool the same is scraped against the steel blades $11$ for purposes of removing the plaster so that the tool in a cleaned condition may again be used for mixing.

In Figs. 4-6 inclusive a modified form of the invention has been disclosed wherein a specific arrangement is provided for releasably holding edge members upon the blades. The advantage of this construction resides in the fact that several types of edge members of different designs may be used with one mixing cup. These edge members may differ from each other in their sharpnesses and sizes.

Specifically, each blade $11$ is formed from a pair of adjacent face to face blade sections $11^a$ and $11^b$. These sections $11^a$ and $11^b$ are of the same size, and are formed with aligned openings 12a through which the material of the rubber mass passes. These blades are molded into the rubber body during its construction.

The adjacent faces of the sections 11a and 11b of each pair of blades are formed with a dovetailed groove 14. An edge member 15 is adapted to be mounted on each pair of blade sections. Each edge member 15 has a tongue 16 engageable in the groove 14 to maintain the position of the edge member. Each edge member is mounted in place by first forcing the upper ends of the blade sections 11a and 11b away from each other, this is possible because of the resiliency of the mass in which the blades are mounted. Then, in the expanded position the edge member is placed so that when the blade sections 11a and 11b are released the tongue 16 will engage into the grooves 14.

In Figs. 7 and 8, the blade 21 is made of a longitudinal bevelled strip of metal with a downwardly projecting finger 21a. These fingers are formed with several openings 22 through which the mass of rubber body 10b passed during the molding of the rubber body.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A plaster mixing cup, comprising a flexible rubber body having an upwardly extending wall, and a plurality of narrow steel blades for forming scraping edges against which tools may be scraped and embedded in the top portions of said wall and projecting slightly from the top edges of said wall, the embedded portions of said blades being formed with apertures with the material of the body extended into said apertures for resiliently holding each of said blades.

2. A plaster mixing cup, comprising a flexible rubber body having an upwardly extending wall, a plurality of narrow steel blades for forming scraping edges against which tools may be scraped and embedded in the top portions of said wall and projecting slightly from the top edges of said wall, each of said blades comprising an adjacent pair of face to face sections, each of said sections being formed with a cutout in its inner top edge portion and said cutouts being aligned to form a dovetailed groove, and edge members releasably engageable upon the projecting portions of said blades so that differently shaped edge members may be selectively engaged thereon, each of said edge members being formed with a tongue engageable into said grooves.

PAUL RINGMAN.